United States Patent [19]

Pyzik et al.

[11] Patent Number: 5,503,213
[45] Date of Patent: Apr. 2, 1996

[54] SHAPED CERAMIC-METAL COMPOSITES

[75] Inventors: Aleksander J. Pyzik, Midland; Jack Ott, Hemlock; Tim L. Allen, Midland, all of Mich.

[73] Assignee: The Dow Chemical Company, Midland, Mich.

[21] Appl. No.: 214,864

[22] Filed: Mar. 16, 1994

[51] Int. Cl.$^6$ .................... B22D 19/14; B22D 19/00
[52] U.S. Cl. .................................. 164/97; 164/98
[58] Field of Search .............................. 164/97, 98

[56] References Cited

U.S. PATENT DOCUMENTS

| | | | |
|---|---|---|---|
| 2,665,999 | 1/1954 | Koehring | 117/112 |
| 2,706,694 | 4/1955 | Haller | 117/112 |
| 3,285,714 | 11/1966 | Davies et al. | 29/182.1 |
| 4,885,130 | 12/1989 | Claar et al. | 419/12 |
| 4,935,055 | 6/1990 | Aghajanian et al. | 164/66.1 |
| 5,007,474 | 4/1991 | Langensiepen et al. | 164/97 |
| 5,007,476 | 4/1991 | Newkirk et al. | 164/97 |
| 5,119,864 | 6/1992 | Langensiepen et al. | 164/97 |
| 5,141,819 | 8/1992 | Aghajanian et al. | 428/545 |
| 5,205,970 | 4/1993 | Brun et al. | 264/60 |
| 5,340,655 | 8/1994 | Creber et al. | 428/446 |

FOREIGN PATENT DOCUMENTS 52-26562  2/1977  Japan.

*Primary Examiner*—P. Austin Bradley
*Assistant Examiner*—I.-H. Lin

[57] ABSTRACT

A method to at least partially impregnate a porous ceramic body with a metal comprising positioning a sacrificial porous ceramic transport means in physical contact with the metal and between the porous ceramic body to be impregnated and the metal; interposing a sufficient amount of a ceramic powder in contacting relationship between the ceramic body and the transport means to enable the metal to flow from the ceramic transport means to the ceramic body and insufficient to permit metal bonding between the transport means and the ceramic body, at least one constituent of the powder being wettable by, and chemically reactive with the metal; and maintaining at least the ceramic body and metal transport means at a temperature, and for a time, sufficient for at least a portion of the metal to flow through the transport means and into the ceramic body to impregnate the ceramic body a predetermined amount to form a metal impregnated ceramic body of near net shape.

20 Claims, No Drawings

SHAPED CERAMIC-METAL COMPOSITES

BACKGROUND OF THE INVENTION

This invention relates to ceramic parts and more in particular to shaped ceramic composites impregnated with a metal.

It is oftentimes desired to utilize a ceramic-metal composite to achieve the beneficial properties of both the ceramic and metal while minimizing or reducing the negative attributes of each. When forming the ceramic-metal composite, excess metal is frequently utilized to assure that the ceramic will be completely impregnated with the metal. At times extra metal, i.e. metal in excess of that required to fully impregnate the ceramic, is used during impregnation to minimize the possibility that undesirable reaction products present on the surface of molten metal will enter into the ceramic matrix and cause a deleterious effect upon the chemical and/or physical properties of the impregnated body. This may result in the impregnated shape requiring machining or grinding to remove the extra metal from the exterior surface of the ceramic.

The present invention is a process to impregnate one or more ceramic parts with metal to achieve a substantially net shape ceramic product requiring little, if any, finish work, such as machining or grinding, prior to use.

SUMMARY OF THE INVENTION

The present invention is a method to at least partially impregnate a porous ceramic body with a metal comprising:

a) positioning a sacrificial porous ceramic transport means in physical contact with the metal and between the porous ceramic body to be impregnated and the metal;

b) interposing a sufficient amount of a ceramic powder in contacting relationship between the ceramic body and transport means to enable the metal to flow from the ceramic transport means to the ceramic body and insufficient to permit metal bonding between the transport means and the ceramic body, the powder being wettable by the metal and the metal being chemically reactive with at least one constituent in the ceramic powder; and c) maintaining at least the ceramic body and metal transport means at a temperature and for a time sufficient for at least a portion of the metal to flow through the transport means and into the ceramic body to impregnate the ceramic body a predetermined amount to form a metal impregnated ceramic body of near net shape.

DESCRIPTION OF THE PREFERRED EMBODIMENTS

The presently described invention to at least partially impregnate a porous ceramic body with a metal can be carried out in several different ways. The metal is chemically reactive with at least one constituent of a ceramic powder interposed between the ceramic body and a sacrificial porous ceramic transport means. In one embodiment, a ceramic body composed of, for example, alumina ($Al_2O_3$), aluminum nitride (AlN), boron carbide ($B_4C$), silicon carbide (SiC), silicon hexaboride ($SiB_6$), titanium diboride ($TiB_2$) or mixtures of such compounds are formed by well known conventional means. The porous body preferably consists essentially of $B_4C$. In the present process, the constituents of the ceramic can be either chemically reactive or non-reactive with the particular metal impregnated into the body.

As aforementioned suitable metals are selected to react with at least a constituent in the ceramic particulate. Such materials can be, for example, aluminum, iron, magnesium, manganese, titanium, zirconium, and alloys preferably containing at least about 80 weight percent (wt. %) of at least one of these metals. When the ceramic is $B_4C$ a suitable reactive metal would be aluminum or aluminum base alloys preferably containing greater than about 80 wt. % aluminum and preferably, greater than about 90 wt. % and more preferably, greater than about 92 wt. % aluminum. In certain instances, it may be desirable to impregnate the ceramic with a commercially pure form of aluminum containing at least about 99 wt. % aluminum and preferably at least about 99.4 wt. % aluminum.

When desired, the present invention can be used in such a manner to produce a near net shape metal impregnated part, that is a part suitable for final use with little or no final sizing by, for example, machining, grinding and the like. When such a final, or net shape, impregnated body is desired, the initial unimpregnated porous ceramic material is prepared to a final size and configuration prior to impregnation. After impregnation by the presently described method, the infiltrated part can be immediately used upon cooling, since little or preferably, no excess metal remains on the surface of the porous ceramic composite.

The porous ceramic body is impregnated by positioning at least one surface portion of the ceramic body in physical contact with a thin layer of ceramic particulate positioned between the ceramic body and a sacrificial porous transport means. At least one constituent, and preferably all, of the ceramic particulate is reactive with the metal. Preferably the particulate is the same composition as the ceramic body, however, if desired, a different ceramic composition can be utilized for the particulate. A relatively thin layer of the particulate is placed between the ceramic part and the transport means. The layer should be of a sufficient thickness to permit metal to wet the ceramic particulate and flow from the transport means to the porous ceramic part. The layer thickness should also be insufficient to leave a metal residue between the transport means and the ceramic body after impregnation. It is believed that use of a thin layer of particulate will permit substantially all of the metal at the interface between the ceramic part and the transport means to react with the ceramic particulate after impregnation and permit the non-destructive separation of the ceramic part from the transport means. Particle sizes of less than about 40 microns in diameter are preferred. When using particles of less than about 40 microns diameter, the layer thickness is preferably less than about 5 particle diameters. More preferably, the thickness is less than about 3 particle diameters and even more preferably, less than about 2 particle diameters.

The transport means is preferably composed of substantially the same ceramic as the porous body to be impregnated, but may, if desired, be a different material so long as the molten metal can flow through the transport means without contaminating the molten metal with impurities deleterious or undesired in the final impregnated ceramic body. It is important for the porous body and the porous transport means to be in sufficiently close physical contact with each other to enable the molten metal to readily flow from the transport means into the ceramic body. It has been found, however, that this close contact and required metal flow from the transport means to the ceramic body cannot be accomplished simply by machining, grinding or otherwise making the contacting surface of the transport means substantially a mirror image of the adjacent contacting portion of the ceramic body.

Metal flow between the ceramic body and the ceramic part can be achieved by placing ceramic powder inert to the metal between and in contact with the ceramic body and transport means. Within reasonable particle size limits the metal will flow by what is thought to be capillary action between the porous pieces whether or not the particulate is reactive with the metal. It has been determined, however, that when the ceramic powder is substantially non-reactive with the metal, and at least partial infiltration of the ceramic body occurs, that metal remaining between the transport means and ceramic body bonds the two parts together. When the metal and particulate react and the size of the particulate is controlled in accordance with the present invention, the infiltrated ceramic body is readily removed from the transport means without metal bonding the ceramic surfaces of the body and transport means together.

Both the ceramic body and the ceramic transport means are sufficiently porous to enable the molten metal to flow into the body and fill a predetermined volume of the interconnected pores within the ceramic material. Generally and preferably, the ceramic body being impregnated is substantially entirely filled with the impregnating metal. Pore sizes of from about 0.1 to about 25 microns and preferably from about 0.1 to about 5 microns in the ceramic body can be advantageously filled with aluminum when the ceramic is $B_4C$. The pore sizes may vary somewhat depending upon the specific ceramics and metals used for impregnation, however, suitable pore sizes can be readily determined based upon readily available information about the surface tension properties of the molten metal or by simply testing the wetability of the ceramic by the metal.

The molten metal is considered to wet a particular ceramic when the contact angle between the molten metal and the ceramic is less than about 90° and preferably less than about 45°. This can be determined by well known means, such as, placing a piece of solid metal on the ceramic, heating above the melting temperature of the metal and observing the angle. The ceramic is clearly "wet" by the metal when the metal flows over the ceramic surface rather than forming a distinct drop on the ceramic surface.

Usually, the pore size range in the transport means will be substantially the same as those for the body being impregnated. However, the size of the pores in the transport means is not as important as for the shape being impregnated. Accordingly, the pores in the transport means preferably range from about 0.1 to about 25 microns.

The ceramic body is placed in intimate contact with the abutting surface of the transport means, with the ceramic particulate interposed therebetween, in a container adapted to be operated at an elevated temperature and under a controlled atmosphere to minimize a reaction between gases in the air and either the ceramic or molten metal. In a preferred embodiment, the atmosphere within the container is evacuated and a vacuum of at least about $10^{-1}$ torr and more preferably from about $10^{-1}$ to about $10^{-7}$ torr is formed. The temperature is raised sufficiently to enable an impregnating metal, such as aluminum and aluminum base alloys for $B_4C$ and $TiB_2$, to melt and flow into the porous ceramic transport means. It has been surprisingly found, that aluminum will flow through the pores of a preferred $B_4C$ transport means and continue to flow through the layer of reactive ceramic powder between the transport means and the body to be impregnated to enable the ceramic body to be impregnated a predetermined amount. The ceramic body can be readily impregnated without using excess metal by calculating the pore volume within the transport means and the ceramic body and using only that amount, or a slight excess, of metal in the atmospherically controlled container prior to heating and melting. When it is desired to fill substantially all of the pores in the ceramic body, the volume of metal employed should be at least equal to the combined volume of pores within the ceramic body and the transport means.

After impregnation is completed, the ceramic body is generally cooled sufficiently within the atmospherically controlled furnace or other container to permit the metal to solidify prior to removal of the vacuum. This, however, is a preferred mode of operation to minimize possible contamination of the metal and ceramic with reaction products capable of forming between the molten metal and gases within the air. If such contamination is not objectionable in the use contemplated, the vacuum can be removed at an earlier time. If desired, an inert gas, such as argon, can be used instead of a vacuum to prevent a reaction between the gas and ceramic and/or metal during heating.

Surprisingly, after the ceramic parts have been impregnated and cooled sufficiently for the metal to solidify, the impregnated ceramic shape is readily separated from the transport means without a substantial quantity of metal adhering to the surface portion of the ceramic body in contact with the ceramic particles. Preferably, the exterior surface portions of the ceramic body are substantially free of adhering unimpregnated metal upon separation of the body from the ceramic particles.

The following examples will further exemplify the hereinbefore described process. It is understood that these examples are merely illustrative of the invention and are not intended to restrict or otherwise limit the scope thereof.

EXAMPLE 1

Two porous hemispheric shapes are fabricated from $B_4C$ powder by slip casting. The slip is made by mixing ESK 1500 and ESK 5 micron and finer $B_4C$ powder in water using a weight ratio of 30% ESK 1500 to 70% ESK 5 micron and finer. This product is available from Elektroschmelzwerk Kempten Gmbh, Munchen, Germany. The slip is 40 volume percent solids with the remaining 60 volume percent being water. No binder is used in casting these parts. The density of the ceramic casting is about 70% of the theoretical value. After casting, the shapes are dried for 24 hours at 45° C. and for 48 hours at 85° C. under a vacuum. The so-fabricated hemispheres are heated in an argon atmosphere for 30 minutes at 1300° C. The heating at 1300° C. is believed to strengthen the casting or preform by developing contact points between adjacent $B_4C$ particles without causing much, if any, shrinkage of the preform. The average particle size in the preform will be about 0.3 microns. The pore size in the preform will range from 0.1 to about 5 microns in diameter. After cooling to room temperature, the hemispheres are machined so that when placed together a pipe-like configuration with an outside dimension of 3 inches (7.6 cm) and an inside dimension of 2¾ inches (7.0 cm) is formed.

A monolayer of ESK 1500 $B_4C$ powder is distributed on the contacting surfaces of the hemispheres. The hemispheres are then positioned within a graphite furnace so that the first $B_4C$ hemisphere rests on the bottom of the furnace with two planer edged portions substantially horizontal. The first ceramic hemisphere will act as a transport means for molten metal. The second $B_4C$ hemisphere, i.e. the one to be impregnated, is positioned on the horizontal edge portions of the transport means with the $B_4C$ particulate interposed therebetween in such a manner that the first and second hemispheres form the pipe-like shape. A 50 gram ingot of aluminum with a commercial designation of 1145 is placed within the lower hemisphere.

The graphite furnace is sealed and evacuated to a vacuum of 150 millitorr. The furnace is then heated to a temperature of about 1200° C. and maintained at that temperature for 45 minutes to enable the aluminum alloy to flow into the pores of the lower hemisphere, across the $B_4C$ interfaces between the lower and upper hemispheres and into the pores of the upper hemisphere. Upon cooling, it will be found that the hemispheres are substantially fully impregnated without residual aluminum adhering to either hemisphere at the abutting interfaces. The hemispheres are non-destructively separated by merely lifting one from the other by hand.

EXAMPLE 2

Two 6 inch diameter porous $B_4C$ cylinders are fabricated as described in Example 1. Both of the cylinders will have a density of 68% of the theoretical value and a wall thickness of 0.3 inch (7.6 mm). One cylinder with a height of 1.5 inches (3.8 cm) is used as a sacrificial metal transport means. The surfaces of both cylinders to be in contact are sprayed with a monolayer of ESK 1500 $B_4C$ powder. Thereafter, the second cylinder, 5 inches (12.7 cm) high, is placed directly on top of the sacrificial cylinder so that substantially all of the transverse edge portions of the top cylinder is in intimate physical contact with the corresponding transverse edge portion of the upstanding sacrificial transport means. Both of the cylinders are positioned within a graphite furnace in a pan suitable for retaining molten aluminum. Ingots of 1145 aluminum weighing about 150 grams are placed in the pan and the furnace sealed. After the furnace is evacuated to form a vacuum of 100 millitorr, it is heated to 1150° C. and maintained at such temperature for 120 minutes to permit aluminum to flow into the sacrificial $B_4C$ cylinder, across the interface between the sacrificial cylinder and into the pores within the upper cylinder. After cooling, both the sacrificial cylinder and the upper cylinder are fully infiltrated with aluminum.

The upper part is easily, non-destructively separated from the transport means by hand lifting. Upon examination, the 5 inch (12.7 cm) long cylinder will be found to be free of excess aluminum on the surface, fully infiltrated with aluminum and crack free. The 1½ inch (3.8 cm) sacrificial cylinder, however, was cracked and had areas of uninfiltrated aluminum adhering to exterior surfaces.

EXAMPLE 3

Four 2×2.5×0.5 inch (5.1×6.4×1.3 cm) porous boron carbide blocks are fabricated as described in Example 1 with the exception that the baking temperature is 1250° C. Following heating, the surfaces of the blocks to be in contact with each other are rubbed together to form a layer of free boron carbide particles. The first block is placed in a container with the other three blocks being stacked one on top of the other with the boron carbide particle layer spacing apart the individual blocks. Aluminum alloy with a commercial designation of 6061 is infiltrated into the blocks as described in Example 2 using a temperature of 1150° C. for an infiltration duration of 2 hours. The aluminum alloy will flow into the bottom blocky which is used as a transport means to enable the aluminum to flow from the container through the transport means and sequentially into the other three blocks stacked on top of each other. After the parts are cooled to about room temperature, they are readily separated by manually lifting them from one another. The top three blocks will be found to be crack free, fully infiltrated and free of uninfiltrated aluminum adhering to the exterior boron carbide surfaces. These blocks are useful without further machining. The bottom block, which is used as a sacrificial transport means, will have aluminum residue adhering to the exterior surfaces and is discarded.

EXAMPLE 4

Grade B $TiB_2$ powder with an average particle size of 4 microns is purchased from Hermann C. Starck Gmbh. The powder is pressed into two disks with a density of 50% the of theoretical value. Each disk will be one inch (2.5 cm) in diameter and 0.25 (6.3 mm) inch high.

A 15 micron thick layer of $B_4C$ powder with a particle size of 5 microns is sprayed onto the planer surfaces of the unsintered disks to be in mutual contact. The disks are then positioned on top of each other so that the $B_4C$ coated planer surface of one disk is in contact with a corresponding $B_4C$ coated surface of the other disk. The stacked disks are then placed on top of a sufficient amount of 1145 aluminum to fully infiltrate the disks. The aluminum and the disks are heated in a furnace under a vacuum of 100 millitorr at 1200° C. for 45 minutes. After cooling in the vacuum to room temperature, the disks are removed from the furnace and found to be substantially entirely impregnated with aluminum. The upper disk is then manually separated from the lower disk by hand lifting without the use of any tools or other equipment. The so-removed disk will be substantially free of surface aluminum making machining of the top disk before use unnecessary.

EXAMPLE 5

Two porous $B_4C$ preforms with a size of 2×0.5×0.5 inch (5.1×1.3×1.3 cm) are prepared as described in Example 1. All surfaces of these blocks are machined with a 200 grit diamond wheel.

The blocks are then stacked with the 2×0.5 inch (5.1×1.3 cm) surfaces in mutual contact with an about 10 micron thick layer of 3 micron diameter $B_4C$ particles placed between the blocks. The stacked blocks are placed on a sufficient quantity of 1145 aluminum to completely impregnate the blocks. Thereafter, the blocks are heated in a graphite furnace at 1150° C. for 45 minutes in a vacuum of 100 to 150 millitorr. Upon cooling to room temperature in the vacuum, the upper block of $B_4C$ will be completely infiltrated with aluminum. Metallic aluminum will be absent at the interfacing surfaces of the blocks having reacted with the layer of boron carbide particles.

EXAMPLE 6

Two $B_4C$ blocks are prepared, heated and infiltrated with aluminum as described in Example 5 except that a 90–150 microns thick layer of 45 micron diameter $B_4C$ particles is placed between the porous blocks. After heating and infiltration with aluminum, the lower block will be fully, and the upper block partially, infiltrated with aluminum. No metallic aluminum residue will be observed on the interfacing surfaces of the blocks, which are readily separated.

COMPARATIVE EXAMPLE A

Two $B_4C$ blocks are prepared, heated and infiltrated with aluminum as described in Example 5 except that no $B_4C$ powder is placed between the blocks. After heating and infiltration with aluminum, the lower block will be fully infiltrated with aluminum. The top porous block will remain porous with no aluminum infiltration being observable. No aluminum will be observed at the interface between the blocks. The blocks are easily separated from each other without need for mechanical assistance.

COMPARATIVE EXAMPLE B

Two $B_4C$ blocks are prepared, heated and infiltrated with aluminum as described in Example 5 except that an about 0.5 mm layer of fine 3 micron diameter $B_4C$ particles is placed between the upper and lower blocks before infiltration. After cooling to room temperature, the blocks will be completely impregnated with aluminum. However, a layer of aluminum will remain to bond the blocks together with sufficient strength to require machining to separate the blocks.

What is claimed is:

1. A method to at least partially impregnate a porous ceramic body with a metal comprising:
   a) positioning a first porous ceramic preform body acting as a transport means in physical contact with the metal and between a terminal porous ceramic preform body to be impregnated and the metal;
   b) interposing a sufficient amount of a ceramic powder in contacting relationship between the first and terminal ceramic bodies to enable the metal to flow from the first ceramic body to the terminal ceramic body and insufficient to permit bonding between the first and terminal ceramic bodies, the powder being wettable by the metal and the metal being chemically reactive with at least one constituent in the ceramic powder; and
   c) maintaining at least the first and terminal ceramic bodies at a temperature and for a time sufficient for at least a portion of the metal to flow through the first ceramic body and into the terminal ceramic body to impregnate the terminal ceramic body a predetermined amount to form a metal impregnated ceramic body of near net shape.

2. The method of claim 1 including additional step (d) non-destructively separating the impregnated body from the ceramic powder contacting the first ceramic body to recover a near net shape impregnated body without unimpregnated metal adhering to an exterior surface portion of the body.

3. The method of claim 1 wherein the first and terminal ceramic bodies are selected from the group consisting of $Al_2O_3$, AlN, $B_4C$, $SiB_6$, SiC, $TiB_2$ and mixtures thereof.

4. The method of claim 3 wherein the metal is selected from the group consisting of aluminum and aluminum base alloys.

5. The method of claim 4 wherein the first and terminal ceramic bodies consist essentially of $B_4C$.

6. The method of claim 1 including reacting the metal and the ceramic powder to enable non-destructive separation of the terminal ceramic body and the first ceramic body.

7. The method of claim 6 wherein the terminal ceramic body is in final shape upon separation.

8. The method of claim 1 wherein the first and terminal ceramic bodies consist essentially of $B_4C$.

9. The method of claim 1 wherein in step (c) the first and terminal ceramic bodies are maintained in a vacuum of at least about $10^{-1}$ torr.

10. The method of claim 1 including the additional step of finishing the terminal ceramic body to final shape and dimensions before impregnation.

11. The method of claim 1 wherein at least one constituent in the first and terminal ceramic bodies are chemically reactive with the metal.

12. The method of claim 1 wherein the ceramic powder has a particle size of less than about 40 microns and the ceramic powder in step (b) forms a layer with a thickness of less than about 5 particle diameters.

13. The method of claim 1 wherein the ceramic powder has a particle size of less than about 5 microns and the ceramic powder in step (b) forms a layer with a thickness of less than about 3 particle diameters.

14. The method of claim 1 wherein the ceramic powder has a particle size of less than about 5 microns and the ceramic powder in step (b) forms a layer with a thickness of less than about 2 particle diameters.

15. The method of claim 1 wherein the ceramic powder consists essentially of $B_4C$.

16. The method of claim 1 including substantially entirely impregnating the terminal ceramic body.

17. The method of claim 1 wherein the size of the pores in the first and terminal ceramic bodies are about 0.1 to about 25 microns.

18. The method of claim 1 wherein the first ceramic body is sacrificed during step (c).

19. The method of claim 1 wherein more than one terminal porous ceramic body is impregnated with metal by sequentially contacting a plurality of terminal ceramic bodies in which at least one terminal body is in contact with the first ceramic body and at each contacting of the ceramic bodies the ceramic powder is interposed.

20. A method comprising impregnating a porous boron carbide body with aluminum or an aluminum base alloy comprising:
   a) positioning a first boron carbide preform body with interconnecting pores and the aluminum or aluminum alloy in physical contact;
   b) spacing apart a terminal boron carbide preform body from the first boron carbide body by a layer of boron carbide powder with a particle size of up to about 40 microns, the layer having a thickness of less than about 5 particle diameters;
   c) maintaining the first and terminal boron carbide bodies and the aluminum or aluminum alloy in a vacuum of at least about $10^{-1}$ torr and at a temperature of at least the liquidus temperature of the aluminum or aluminum alloy for a time sufficient for at least a portion of the aluminum or aluminum alloy to flow through the first boron carbide body and into the terminal boron carbide body to substantially entirely impregnate the terminal boron carbide body;
   d) cooling at least the first and terminal boron carbide bodies to below the solidus temperature of the aluminum or aluminum alloy; and
   e) non-destructively separating the terminal boron carbide body from the first boron carbide body to recover a net shape metal impregnated boron carbide body.

* * * * *